United States Patent
Rojas et al.

(10) Patent No.: US 11,874,295 B2
(45) Date of Patent: Jan. 16, 2024

(54) ELECTROMAGNETIC SLOSH AND LIQUID POSITION DETECTION

(71) Applicant: Embry-Riddle Aeronautical University, Inc., Daytona Beach, FL (US)

(72) Inventors: Eduardo Antonio Rojas, Port Orange, FL (US); Bogdan Udrea, Kihei, HI (US); Daniel Sommer, South Daytona, FL (US); Nicholas Moline, Daytona Beach, FL (US)

(73) Assignee: Embry-Riddle Aeronautical University, Inc., Daytona Beach, FL (US)

( * ) Notice: Subject to any disclaimer, the term of this patent is extended or adjusted under 35 U.S.C. 154(b) by 194 days.

(21) Appl. No.: 17/478,212

(22) Filed: Sep. 17, 2021

(65) Prior Publication Data
US 2022/0091156 A1   Mar. 24, 2022

Related U.S. Application Data

(60) Provisional application No. 63/080,490, filed on Sep. 18, 2020.

(51) Int. Cl.
| | | |
|---|---|---|
| G01P 15/125 | (2006.01) | |
| G01F 23/263 | (2022.01) | |
| G01F 23/00 | (2022.01) | |

(52) U.S. Cl.
CPC .......... *G01P 15/125* (2013.01); *G01F 23/263* (2013.01)

(58) Field of Classification Search
CPC .... G01F 23/2962; G01F 23/284; G01F 23/00; F17C 2250/034; F17C 5/007
See application file for complete search history.

(56) References Cited

U.S. PATENT DOCUMENTS

| | | |
|---|---|---|
| 3,578,755 A | 5/1971 | Bynum et al. |
| 8,353,209 B1 | 1/2013 | Zimmerli |

(Continued)

OTHER PUBLICATIONS

"Space Environment: Total Launches by Country", Aerospace Security, © 2019 by the Center for Strategic and International Studies, [online]. Retrieved from the Internet: <URL: https://aerospace.csis.org/data/space-environment-total-launches-by-country/>, (updated Mar. 30, 2020), 3 pgs.

(Continued)

*Primary Examiner* — Jermele M Hollington
*Assistant Examiner* — Temilade S Rhodes-Vivour
(74) *Attorney, Agent, or Firm* — Schwegman Lundberg & Woessner, P.A.

(57) ABSTRACT

Apparatus and techniques are described for monitoring slosh of a liquid within a propellant tank. The approaches described herein can use an electromagnetic transmitter positioned at a first location on or within the tank, the electromagnetic transmitter coupled to a source of electromagnetic energy and arranged to establish a specified electromagnetic field configuration within the tank using a signal from the source, and an electromagnetic receiver positioned at a different second location on or within the tank, the electromagnetic receiver arranged to sense an electromagnetic field established within the tank by the electromagnetic transmitter. A control circuit can be coupled to the electromagnetic receiver, the control circuit configured to determine a characteristic of a spatial configuration of the liquid using the sensed electromagnetic field. The characteristic can include one or more of a position, a quantity, or a spatial distribution of the liquid, as an illustration.

20 Claims, 10 Drawing Sheets

(56) References Cited

U.S. PATENT DOCUMENTS

| | | | | |
|---|---|---|---|---|
| 10,508,968 | B1* | 12/2019 | Vaganay | G01N 17/04 |
| 2014/0063676 | A1* | 3/2014 | Sigalov | H05B 6/645 |
| | | | | 361/143 |
| 2016/0203901 | A1 | 7/2016 | Sivasubramanian et al. | |
| 2016/0266240 | A1* | 9/2016 | Hughes | G01S 13/88 |
| 2016/0318708 | A1 | 11/2016 | Kim et al. | |
| 2017/0284852 | A1* | 10/2017 | Al-Kattan | G01F 23/72 |
| 2018/0156652 | A1* | 6/2018 | Williams | G01S 7/2921 |
| 2019/0277224 | A1 | 9/2019 | Boelitz et al. | |
| 2020/0355540 | A1* | 11/2020 | Moore | G01F 23/2968 |

OTHER PUBLICATIONS

Bayle, O., et al., "Influence of the ATV Propellant Sloshing on the GNC Performance", AIAA Guidance, Navigation and Control Conference and Exhibit, (Aug. 5-8, 2002, Monterey, California), (Aug. 2002), 1-10.

Boissonneault, T., "AFRC and Airbus DS aim to bring fuel tank production for spacecraft back to UK", 3D Printing Network, [online]. Retrieved from the Internet: <URL: https://www.3dprintingmedia.network/afrc-airbus-fuel-tank-production-space-uk/>, (Aug. 16, 2019), 4 pgs.

Chintalapati, Sunil, et al., "Design of an Experimental Platform for Acquisition of Liquid (Slosh Data aboard the International Space Station", 48th AIAA/ASME/SAE/ASEE Joint Propulsion Conference & Exhibit, (Jul. 30-Aug. 1, 2012, Atlanta, Georgia, (2012), 1-17.

Fries, N., et al., "Modelling of fluid motions in spacecraft propellant tanks—sloshing", Space Propulsion 2012 Conference, (May 7-10, 2012), Bordeaux, France, (2012), 1-11.

Lee, A., et al., "Preliminary Characterization of the Altair Lunar Lander Slosh Dynamics and Some Implications for the Thrust Vector Control Design", AIAA Guidance, Navigation, and Control Conference, (Aug. 2-5, 2010, Toronto, Ontario, Canada), (2010), 34 pgs.

Lockheed Martin, "Giant Satellite Fuel Tank Sets New Record for 3-D Printed Space Parts", [online]. Retrieved from the Internet: <URL: https://news.lockheedmartin.com/2018-07-11-Giant-Satellite-Fuel-Tank-Sets-New-Record-for-3-D-Printed-Space-Parts>, (Jul. 11, 2018), 2 pgs.

Stratasys Direct, Inc., "Lockheed Martin 3D Prints Fuel Tank Simulation with Help from Stratasys Direct Manufacturing", © 2021 Stratasys Direct, [online]. [retrieved on Oct. 4, 2021]. Retrieved from the Internet: <URL: https://www.stratasysdirect.com/resources/case-studies/3d-printed-fuel-tank-lockheed-martin-space-systems-company, (2021), 7 pgs.

Yang, H. Q., et al., "Propellant Sloshing Parameter Extraction from Computational-Fluid-Dynamics Analysis", Journal of Spacecraft and Rockets, 51(31), (May 2014), 908-916.

Bourdelle, A., et al., "Modeling and Control of Propellant Slosh Dynamics in Observation Spacecraft with Actuator Saturations", 8th European Conference for Aeronautics and Aerospace Sciences (EUCASS), (2019), 16 pgs.

Sommer, Daniel, et al., "A Radio-Frequency-Based Propellant Slosh Sensor for Spacecraft Tanks", IEEE Radio and Wireless Symposium (RWS formerly RAWCON), (2021), 67-69.

Zimmerli, G., et al., "Radio Frequency Mass Gauging of Propellants", 45th AIAA Aerospace Sciences Meeting and Exhibit, Aerospace Sciences Meetings, Reno, NV, USA, Jan. 8-11, 2007, (2007), 14 pgs.

* cited by examiner

ELECTROMAGNETIC SLOSH AND LIQUID POSITION DETECTION

CLAIM OF PRIORITY

This patent application claims the benefit of priority of Rojas et al., U.S. Provisional Patent Application Ser. No. 63/080,490, titled "RADIO-FREQUENCY BASED SLOSH AND LIQUID POSITION DETECTION," filed on Sep. 18, 2020, which is hereby incorporated by reference herein in its entirety.

FIELD OF THE DISCLOSURE

This document pertains generally, but not by way of limitation, to liquid position or liquid motion monitoring, and more particularly to electromagnetic-based liquid position or liquid motion monitoring, such as for slosh and liquid position detection in propellant tanks.

BACKGROUND

Vehicles with liquid-filled tanks can be subject to inertial sloshing forces induced by vehicle motion. Mechanical interaction occurs when there is relative movement between a vessel and a liquid contained therein. This liquid-vessel interaction, which is known as an inertial wave, affects the overall dynamic behavior of the vessel, such as a container or tank, and can affect a vehicle housing or carrying such a vessel. Liquid slosh is a recognized dynamic phenomenon in the aerospace engineering field and is considered in relation to spacecraft, ships, and aircraft, as well as in road or rail-based vehicles such as tank wagons, tank trucks, or tank railcars. Spacecraft are particularly vulnerable to slosh, which can induce unwanted dynamic behavior, such as un-commanded oscillation or rotation.

SUMMARY OF THE DISCLOSURE

The present inventors have recognized that generally applied mitigation techniques for sloshing can present various drawbacks, such as a large weight penalty. For example, in one approach, tank sloshing is addressed through passive means for mitigating forces and through mechanical analysis, such as for quantifying the sloshing forces. Such passive technologies can include fixed baffles, slotted plates or tabs, or other mechanical features that are built into or installed within the tank. Baffles, for example, are simple but cannot fully eliminate sloshing forces. In addition, baffles add design and construction complexities to the tank as well as weight. In another approach, either alternatively or in addition to passive techniques, sloshing forces not addressed through tank configuration can be accounted for in guidance, navigation, and control (GNC) systems, such as counteracted with onboard thrust or inertial systems.

For spacecraft, for example, modeling of sloshing effects in propellant tanks can be used to bound the sloshing forces, such as to aid in the implementation of GNC systems and dynamic control features of a spacecraft, such as thrusters or inertial gyroscopes. The present inventors have also recognized that uncertainty in the modeling can result estimating the sloshing forces in such a manner that conservative tolerances result in larger, heavier, components for counteracting sloshing forces. To help address such challenges, the present inventors have recognized that active monitoring of the liquid (e.g. propellant) properties in tanks can help reduce uncertainty in sloshing forces and provide more accurate information to the GNC systems, for example, such as capturing an actual liquid configuration state or other parameters in real time or near-real-time. Use of an active approach for slosh monitoring for feedback can allow a reduction in size or weight of passive features such as baffle systems, or a reduction in forces associated with use of thrusting or inertial control systems. Generally, the present subject matter can generally provide liquid configuration monitoring, such as liquid position data, in a non-invasive and reliable manner. The approaches herein do not require moving parts and can function in inertial or accelerated frames.

In an example, a system for monitoring slosh of a liquid within a propellant tank can include an electromagnetic transmitter positioned at a first location on or within the tank, the electromagnetic transmitter coupled to a source of electromagnetic energy and arranged to establish a specified electromagnetic field configuration within the tank using a signal from the source, an electromagnetic receiver positioned at a different second location on or within the tank, the electromagnetic receiver arranged to sense an electromagnetic field established within the tank by the electromagnetic transmitter, and a control circuit coupled to the electromagnetic receiver, the control circuit configured to determine a characteristic of a spatial configuration of the liquid using the sensed electromagnetic field. The liquid can include fuel or oxidizer, as illustrative examples. The electromagnetic transmitter can include an antenna structure or coupler configured to excite a cavity structure defined by a vessel such as a tank, or a portion thereof.

In an example, a technique such as a method can include monitoring slosh of a liquid within a propellant tank, the method comprising establishing a specified electromagnetic field configuration within the tank using an electromagnetic transmitter at a first location, sensing an electromagnetic field established within the tank by the electromagnetic transmitter using an electromagnetic receiver at a different second location, and using a control circuit, determining a characteristic of a spatial configuration of the liquid using the sensed electromagnetic field.

The determination of the characteristic of the spatial configuration can include using a model-based approach or otherwise using stored representations of different candidate liquid configurations. In yet another example, a technique such as a method can be used for establishing data related to candidate liquid configurations for use in monitoring slosh of a liquid within a propellant tank, the method comprising establishing a specified electromagnetic field configuration within the tank using an electromagnetic transmitter at a first location, sensing an electromagnetic field established within the tank by the electromagnetic transmitter using an electromagnetic receiver at a different second location, and using a control circuit, associating an independently measured characteristic of a spatial configuration of the liquid with at least one determined value associated with a resonance corresponding to the sensed electromagnetic field.

This summary is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
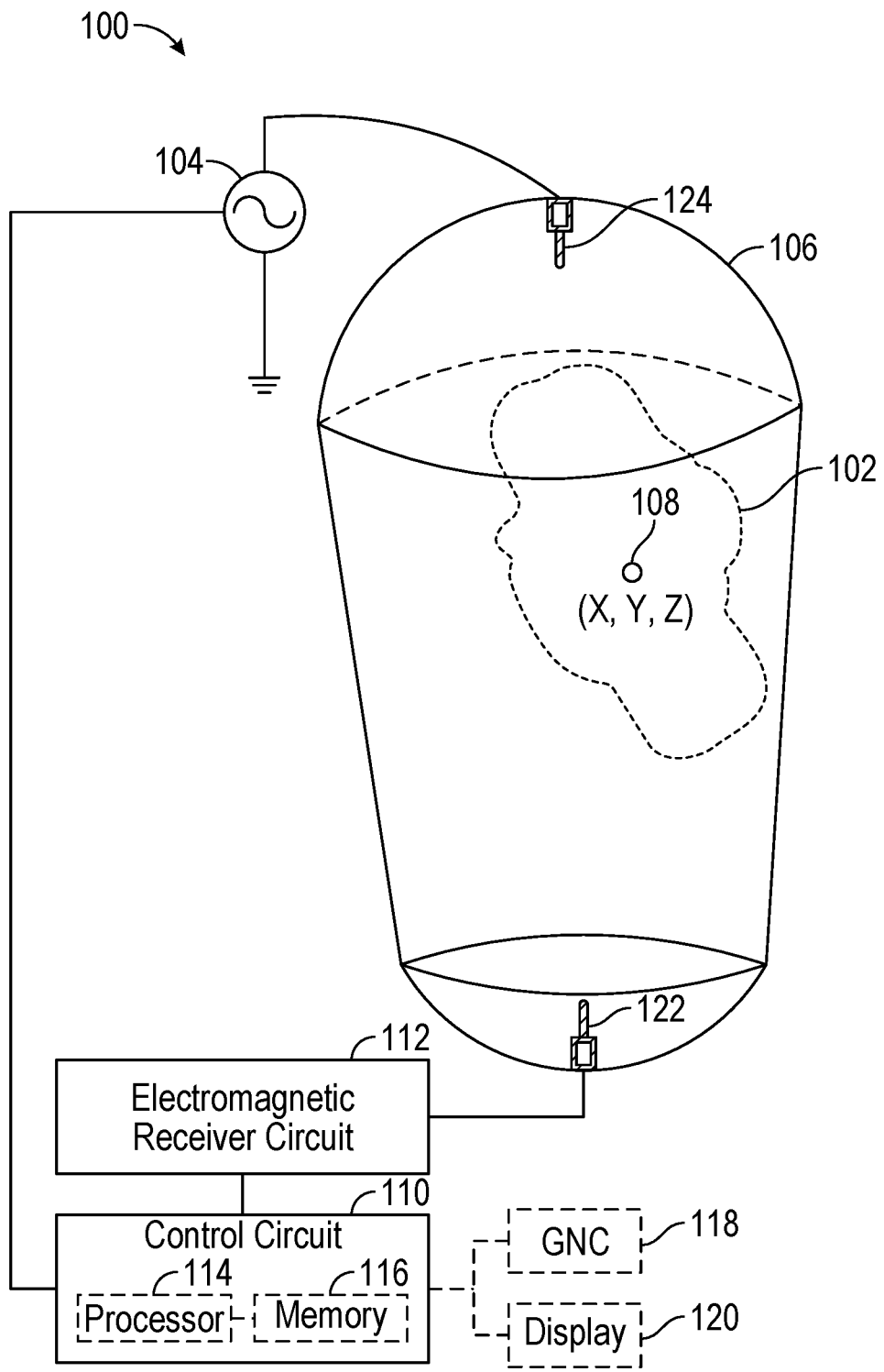
FIG. 1 illustrates an example of a system that can include a tank having a liquid (e.g., propellant) blob inside, along with an electromagnetic transmitter and an electromagnetic receiver.

A physical characteristic such as a spatial configuration (e.g., quantity or position) of a liquid within a tank can be determined using an electromagnetic sensing approach. For example, by treating the tank as a resonating cavity, movement of the fuel inside will produce one or more of a shift in resonant frequencies (e.g., in electromagnetic resonances) or a change in quality factor (e.g., a change in damping behavior), as illustrative examples. Such effects result from differing dielectric properties air, gas, or vacuum, compared to the liquid in the tank (e.g., a liquid comprising a propellant constituent such as an oxidizer or a fuel). As shown generally below, a sphere of a dielectric medium such as distilled water can be moved linearly across a resonating cavity, and observed scattering parameters (e.g., a transmission scattering parameter, $S_{21}$) also changes. Accordingly, use of a frequency domain technique can be used to determine a characteristic of a spatial configuration of a liquid, even in microgravity environments, and without requiring moving parts such as floats or mechanical sensors.

Generally, the examples disclosed herein describe systems and methods that can be used for monitoring a position or other characteristic of propellent in a tank such as for provision to a GNC system. Generally, the examples disclosed herein use an time-varying electromagnetic excitation scheme (e.g., a "radio frequency (RF)" technique such as using a specified range of frequencies in the microwave frequency range) to measure one or more characteristics of a liquid inside the tank. For an example, two electromagnetic transducers (e.g., antennas or couplers) are electromagnetically coupled with the tank. For example, an electromagnetic transmitter can be positioned on one of side of the tank and an electromagnetic receiver can be positioned on an opposite side. An electromagnetic receiver can detect the electromagnetic field intensity which changes as the center-of-mass of the propellent moves throughout the tank. By measuring the electromagnetic field intensity relative to a tank resonance, a position of the center-of-mass of the propellent can be estimated. The techniques herein are suitable for tanks comprising an electrically conductive material, as an illustrative example. Generally, the present subject matter can be used for estimating in real-time or near-real-time (e.g., with sufficiently low latency to permit functioning of guidance or control), the position or another characteristic of a liquid inside of a tank. Such a measured characteristic (or multiple such characteristics) can be used by a vehicle control system to suppress or inhibit potential adverse effect of slosh, such as suppressing or preventing unwanted oscillation and rotation. For example, by measuring the movement of the liquid, reactive measures can be taken by activating thrusters to mitigate the interaction of the liquid with the spacecraft or otherwise suppress unwanted dynamic behavior relating to propellent or other liquid movement within a tank.

FIG. 1 illustrates an example of a system 100 that can include a tank 106 having a liquid 102 (e.g., propellant) blob inside, along with an electromagnetic transmitter 124 and an electromagnetic receiver 122. The propellant tank 106 can include an electromagnetic transmitter 124 (e.g., an antenna structure, waveguide, horn, or other structure to couple electromagnetic energy from the source to the interior of the tank 106) at a first location, such as driven by a frequency-sweeping RF source 104, and the electromagnetic receiver (e.g., another antenna structure, waveguide, horn, or other structure) can be located at a second location. The system 100 can include a receiver circuit 112, such as in communication with a control circuit 110, to determine resonant frequencies or resonant bandwidth ranges for different resonant modes corresponding to the tank 106 and liquid 102 configuration. As an illustration, a location of one or more resonant peaks in the transmission scattering parameter response or other transmission measurement can be used to determine a relative or absolute position (e.g., in cartesian X,Y,Z coordinates or in another coordinate frame) of the liquid 102 inside the tank 106, or a center of mass 108 related thereto. Various resonant modes can have a corresponding different electromagnetic field distribution inside the tank 106. Resonance characteristics (e.g., frequency, peak magnitude, bandwidth or quality factor) may be more sensitive to the material present where the electromagnetic field intensity is high for the spatial field distribution corresponding to a specific resonance. Accordingly, electromagnetic modes can be selected (e.g., either using a specified spatial location or arrangement of transmitters or a specified range of frequencies, or a combination of specified spatial transmission and frequency characteristics) to provide desired spatial selectivity within the tank 106.

The control circuit 110 can include one or more processor circuits (e.g., a processor 114) such as coupled to a memory circuit 116, where the memory circuit stores instructions that, when executed by the processor 114, cause the system 100 to transmit electromagnetic energy using the transmitter 124 and to receive electromagnetic energy using the receiver 122, and to determine a characteristic of the liquid 102, such as providing data indicative of the characteristic to other portions of the system 100, such as a guidance, navigation, and control (GNC) system 118, or to display 120 for presentation to a user.

The techniques described herein can be referred to generally as "resonance gauging." Generally, electromagnetic resonance gauging works by exciting one or more specified modes in a tank and comparing measured field behavior to simulated results, or logged results corresponding to different liquid configurations. For example, by finding the best fit between the measured field behavior and a simulated candidate profile, an estimate or approximation for a liquid characteristic (such as a quantity, center of gravity, or other indicium of spatial configuration such as position) can be obtained. Modes that can be used include transverse modes (such as transverse electric field modes as described below), or other modes (e.g., propagating or evanescent modes, more generally).

For example, successive higher order modes can be excited and one or more of a resonant frequency and associated quality factor, Q, can be determined. From an analytical standpoint, a resonance of a wave in a cavity is generally dependent upon the size of the cavity and can be determined using the formula:

$$f_{mnl} = \frac{ck_{mnl}}{2\pi\sqrt{\mu_e \epsilon_r}} \quad (1)$$

where $f_{mnl}$ is the resonant frequency at the given mode, $k_{mnl}$ is the wave number for the given mode, c is the speed of light, and $\mu_r$ and $\epsilon_r$ are the relative permeability and permittivity of the cavity material, respectively. By modifying the contents of the cavity, both $\mu_r$ and $\epsilon_r$ are changed, causing the resonant frequency to shift. At the same time, it will also modify higher order TM modes. Due to the shift in resonant frequency, the quality factor of the signal should also be modified and can be approximated using:

$$Q \approx \frac{f_{mnl}}{\Delta f} \quad (2)$$

where $\Delta f$ is the bandwidth of the resonant frequency. By analyzing $S_{21}$ of the cavity resonator, the resonance and quality factor for respective observed modes can be obtained. By comparing these to modeled behavior or prior measurements, it is possible to get one or more of a quantity or a position of a liquid (e.g., propellant) in the cavity. By measuring one of the quantity or the position of the liquid 102, or both, a movement of the liquid 102 can be tracked, and reactive measures can be taken such as by activating thrusters to suppress or inhibit the interaction of the liquid with a vehicle such as spacecraft, for example.

Figure 2A:
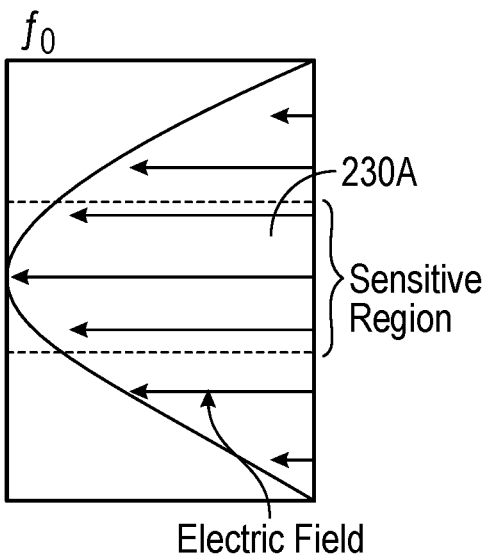
FIG. 2A and FIG. 2B illustrate field distribution for two different transverse electric (TE) modes corresponding to resonant frequencies $f_o$ and $2(f_o)$, respectively.
Figure 2B:
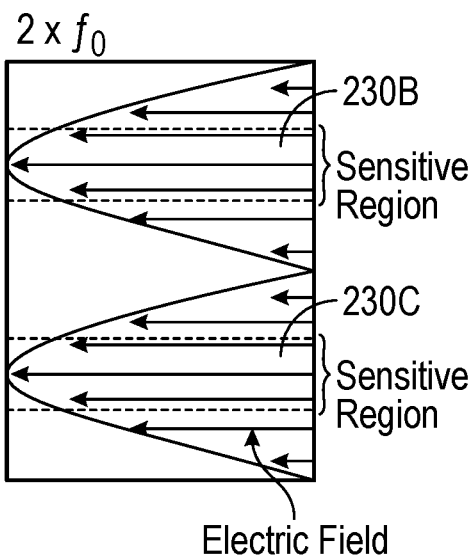
Figure 2C:
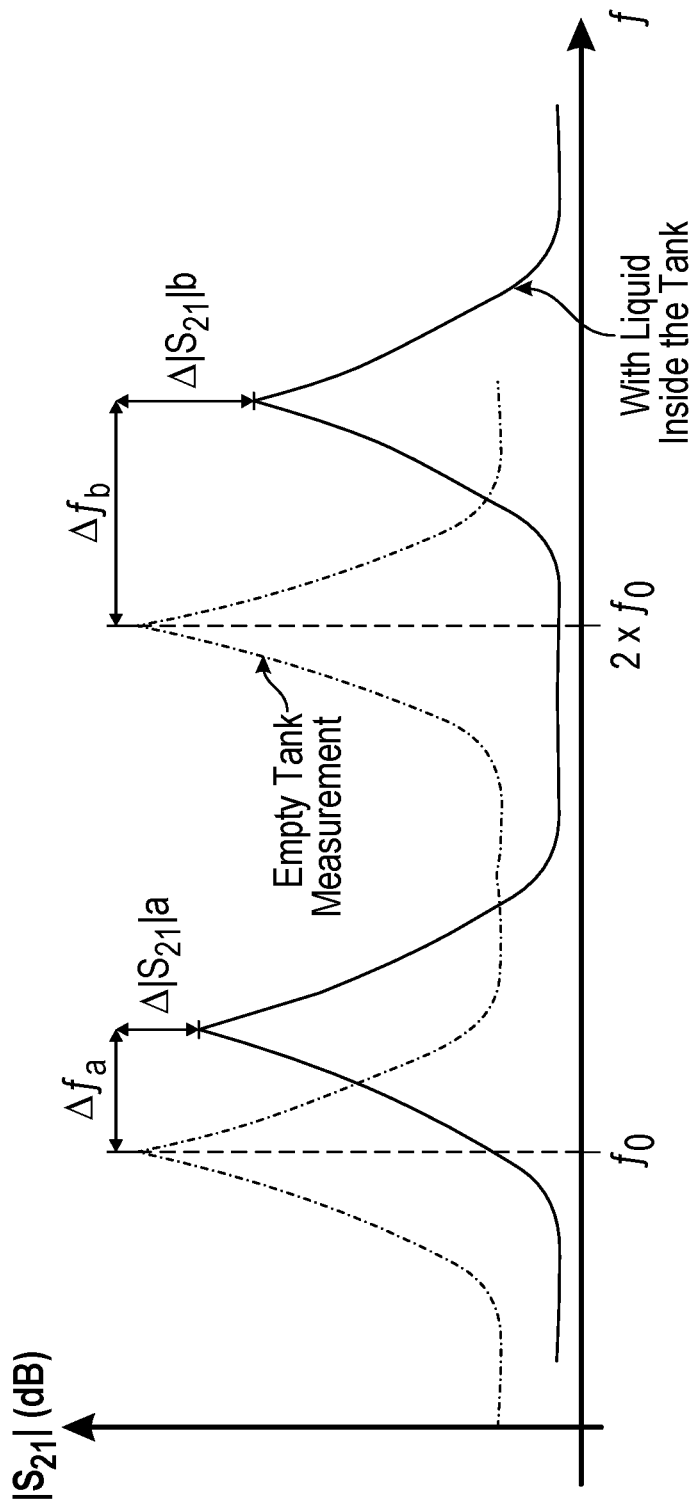
FIG. 2C is an illustrative example showing expected shifts changes in the transmission S-parameter magnitude response of a tank, such as in response to a presence versus an absence of a liquid.

FIG. 2A and FIG. 2B illustrate field distribution for two different transverse electric (TE) modes corresponding to resonant frequencies $f_o$ and $2(f_o)$, respectively and FIG. 2C is an illustrative example showing expected shifts changes in the transmission S-parameter magnitude response of a tank, such as in response to a presence versus an absence of a liquid. As shown in FIG. 2A, the $TE_{10}$ mode has a single spatial location of peak intensity and the resonant frequency, resonant peak level, and bandwidth will be most sensitive to the material that is located at the region 230A highlighted as sensitive in FIG. 2A. For the $TE_{20}$ mode, which is expected at approximately twice the frequency depending on the material distribution, the electric field has two locations having peak field intensity, and its characteristics are more sensitive to the liquid material at these peaks, and surrounding regions 230B and 230C, which are in a different location when compared with the $TE_{10}$ mode of FIG. 2A. The TE modes will continue to increase the numbers of peaks as frequency increases, having n peaks, at around nf0, where f0 is the first TE resonance frequency when the tank is empty. FIG. 2C illustrates the expected S-parameter response of the propellant tank for the $TE_{10}$ and $TE_{20}$ modes (corresponding to a peak at $f_o$ and a peak at $2 \times f_o$, respectively), in both empty and filled conditions. As shown illustratively in FIG. 2C, a resonant peak frequency or a transmission S-parameter magnitude, or both, can shift between an empty state and a state where liquid is present, and such shifts can also occur as the liquid moves within the tank. The magnitude shifts are represented by $\Delta |S_{21}|a$ (e.g., $TE_{10}$ mode) $\Delta |S_{21}|b$ (e.g., $TE_{20}$ mode) values, and the frequency shifts are represented by $\Delta f_a$ and $\Delta f_b$ values.

Figure 3:
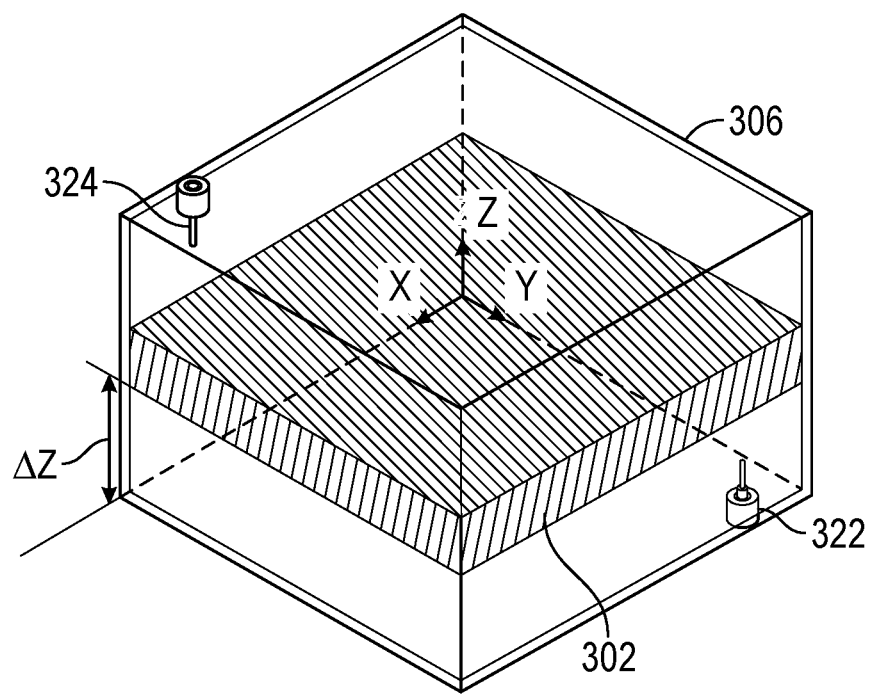
FIG. 3 is an illustrative example comprising a tank configuration that is used to generate the simulated transmission S-parameter magnitude responses shown in FIG. 4.
Figure 4:
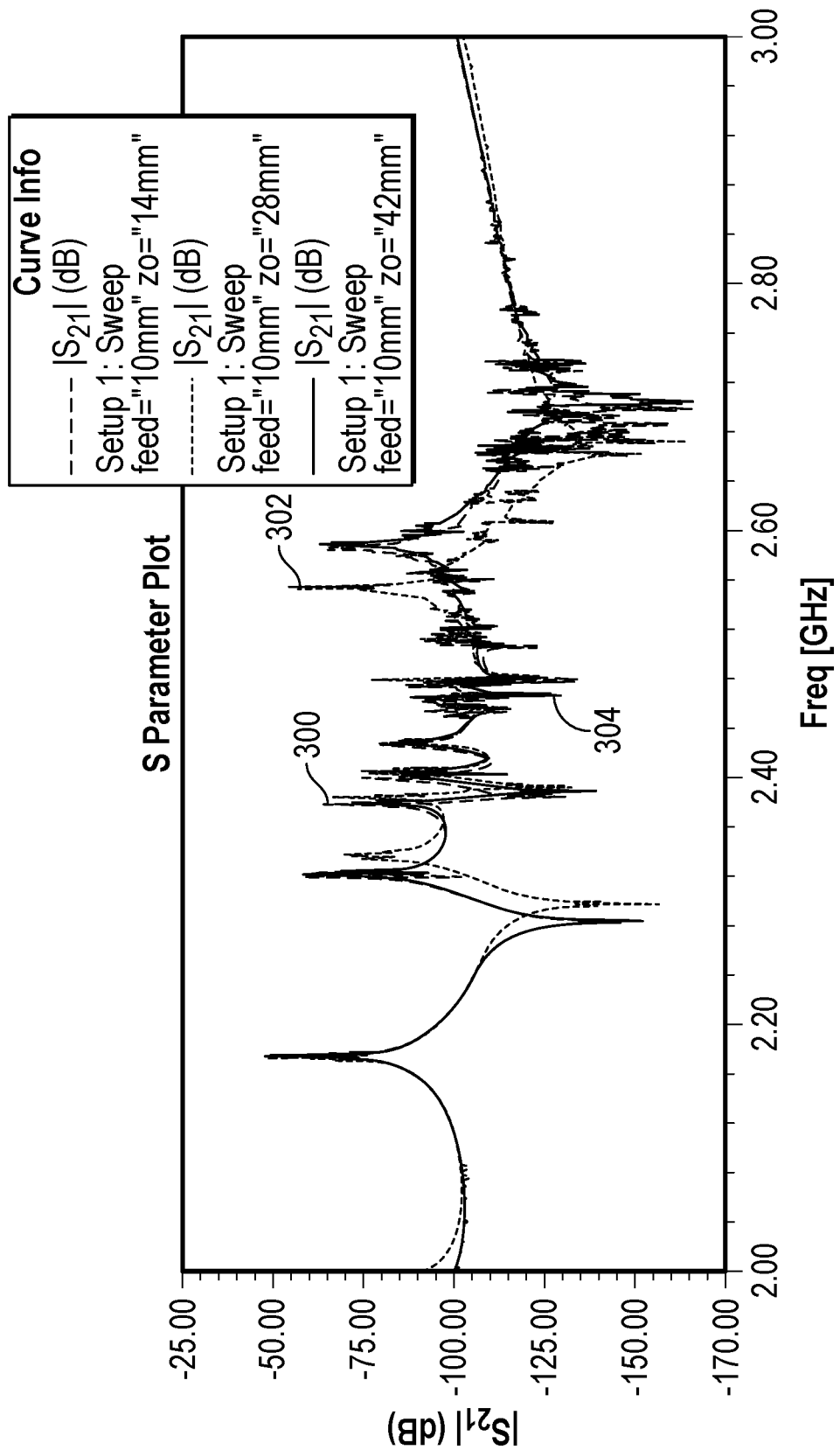
FIG. 4 is an illustrative example comprising a simulated transmission S-parameter magnitude response of the tank configuration of FIG. 3 for different liquid locations (e.g., different ΔZ values of 14 millimeters (mm), 28 mm, and 42 mm, respectively).

FIG. 3 is an illustrative example comprising a tank configuration that is used to generate the simulated transmission S-parameter magnitude responses shown in FIG. 4, which is an illustrative example comprising a simulated transmission S-parameter magnitude response of the tank configuration of FIG. 3 for different liquid locations (e.g., different $\Delta Z$ values of 14 millimeters (mm), 28 mm, and 42 mm, respectively). In FIG. 3, a tank 306 is model having a finite vessel wall thickness, with a liquid 302 block located within the tank 306. A transmitter 324 is located on one wall of the tank 306 and a receiver 322 is located elsewhere. The transmitter 324 and receiver 322 can include short antennas or other structures to couple electromagnetic energy into the tank 306. The tank interior cavity dimensions are 99.54 mm, 98 mm, and 70 mm, respectively, in the X, Y, and Z axes, and a blob position of $\Delta Z$ measured from the bottom of the cavity. Referring to FIG. 4, a simulation of the S-parameter response of the tank 306 with a liquid 302 (modeling a propellant blob) inside was performed using Ansys High-Frequency Structure Simulator (HFSS). In particular, FIG. 4 illustrates the simulated response of the cavity for $\Delta Z$ values of 14 mm (at 300), 28 mm (at 302), and 42 mm (at 304). The resonance and anti-resonance frequencies, as well as the quality factor values, are functions of the position of the liquid 302 ($\Delta Z$). Note that other transverse electric (TE) and transverse magnetic (TM) modes can also be used for detecting position of the liquid, and the modes spanning the frequency range in FIG. 4 are merely illustrative.

As mentioned elsewhere herein, in one approach, a characteristic of a liquid within a tank can be determined by comparing measured data acquired using an electromagnetic receiver against candidate frequency-domain profiles or other data, such as candidate profiles corresponding to different candidate liquid configurations (in terms of quantity or spatial extent of liquid, for example).

Figure 5A:
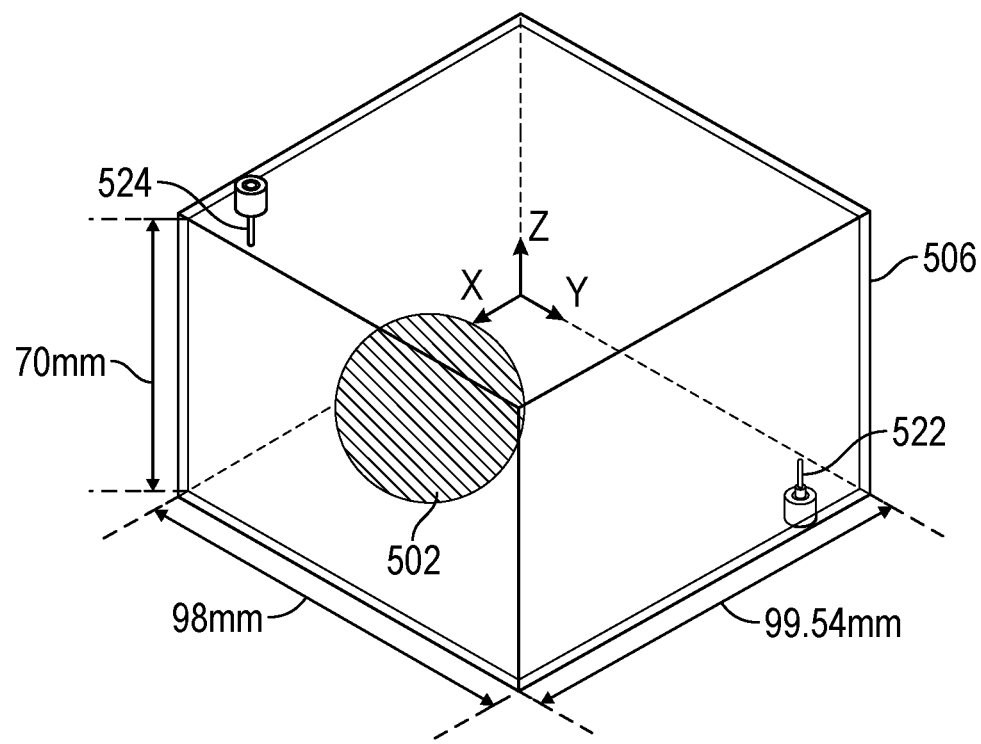
FIG. 5A is another illustrative example comprising a tank configuration that is used to generate the simulated transmission S-parameter magnitude responses shown in FIG. 6A, corresponding to different locations of the liquid sphere along a linear axis.
Figure 5B:
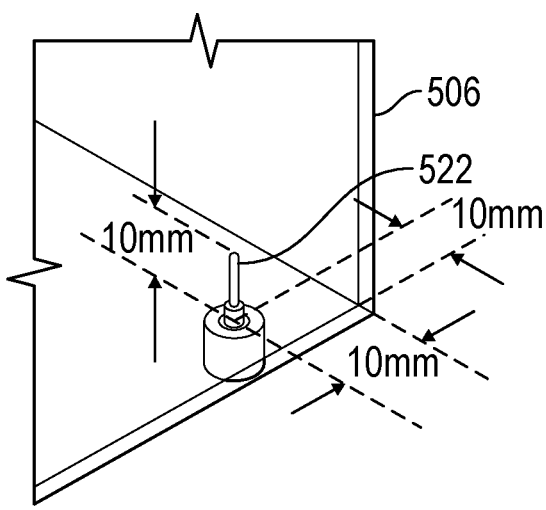
FIG. 5B shows in detail a portion of FIG. 5A corresponding to the electromagnetic receiver.
Figure 6A:
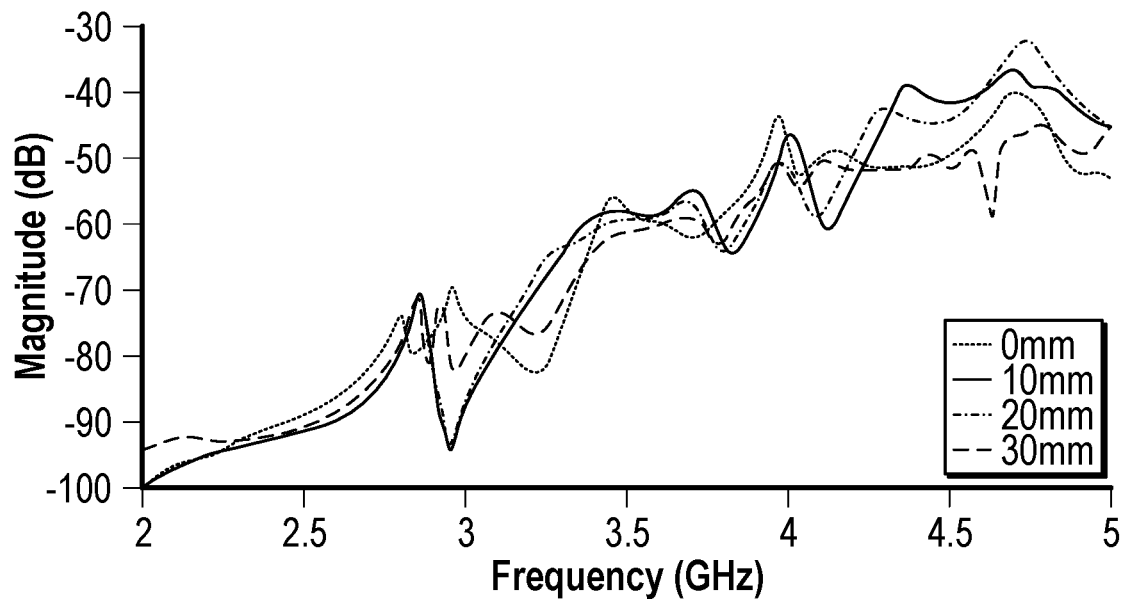
FIG. 6A is an illustrative example comprising a simulated transmission S-parameter magnitude response of the tank configuration of FIG. 5A for different liquid locations (e.g., different Δx values).

FIG. 5A is another illustrative example comprising a tank configuration that is used to generate the simulated transmission S-parameter magnitude responses shown in FIG. 6A, corresponding to different locations of the liquid sphere along a linear axis, and FIG. 5B shows in detail a portion of FIG. 5A corresponding to the electromagnetic receiver. In FIG. 5A and FIG. 5B, the modeled tank 506 can be established in a simulation tool (e.g., HFSS), along with an electromagnetic transmitter 524 and an electromagnetic receiver 522, such as having locations similar to those shown in FIG. 3. Knowing the physical dimensions of the tank 506, resonant modes were calculated to occur at 2.148 gigahertz (GHz), 3.380 GHz, and 4.773 GHz in a 99.54 mm by 98 mm by 70 mm tank. Simulations were run using HFSS by moving a sphere 502, having a radius of 20 mm, in increments of 10 mm across the x-axis of the tank. The sphere 502 was modeled as comprising distilled water, which can be modeled as having a relative dielectric constant of about 81 in the frequency range of interest. Without being bound by theory, similar behavior is expected when the tank 506 is filled with a propellant such as fuel or oxidizer. In this manner, the sphere 502 acts as a proxy for common propellants such as hydrazine, which has a dielectric constant of 52 in the frequency range of interest.

Figure 6B:
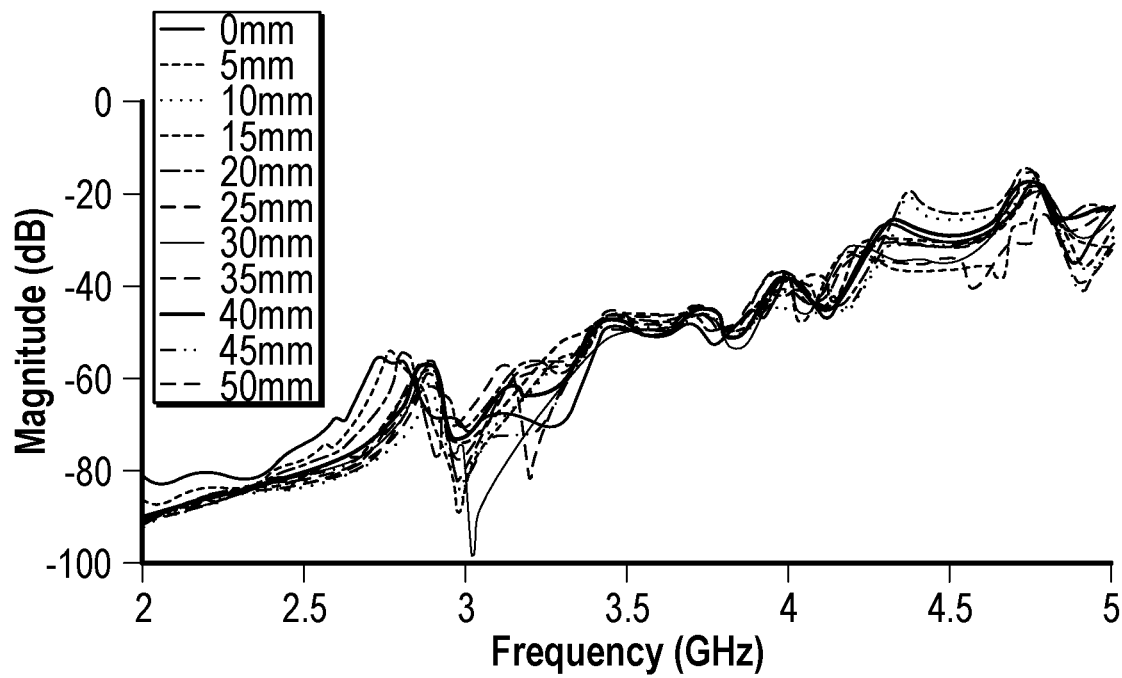
FIG. 6B is an illustrative example comprising experimentally obtained transmission S-parameter magnitude response of the tank configuration of FIG. 5A for different liquid locations (e.g., different Δx values)
Figure 6C:
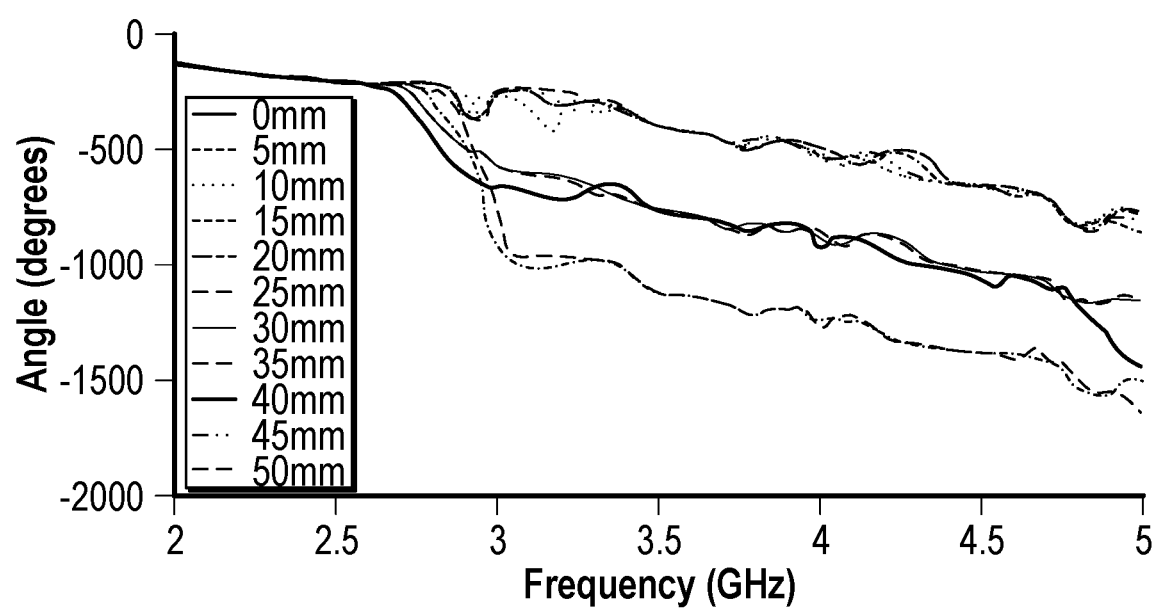
FIG. 6C shows the corresponding transmission S-parameter phase responses.

FIG. 6A is an illustrative example comprising a simulated transmission S-parameter magnitude response of the tank configuration of FIG. 5A for different liquid (e.g., sphere 502) locations (e.g., different $\Delta x$ values). The simulations shown in FIG. 6A can be compared to actual experimentally obtained magnitude responses, as shown in FIG. 6B. FIG. 6B is an illustrative example comprising experimentally obtained transmission S-parameter magnitude response of the tank configuration of FIG. 5A for different liquid locations (e.g., different $\Delta x$ values) and FIG. 6C shows the corresponding transmission S-parameter phase responses. FIG. 6C illustrates that experimentally obtained phase responses also illustrate detectable differences in phase in response to movement of the spherical liquid phantom within the tank. For the experimentally obtained S-parameter measurements, the tank was fabricated using 10 pieces of 1/16th inch 110 Copper cut and bent to form the dimensions specified by the HFSS model. SMA bulkhead connectors were placed in both of the specified locations as well. The CAD file for this physical model was imported into HFSS and simulated as a confirmation that the subtle changes in geometry would have a negligible effect on the S-parameter responses for frequencies of interest. The copper sheets were milled, bent, and soldered together with 63/37 solder, and tolerances were verified to within plus or minus 5 mm.

The testing method included incrementing the phantom sphere x-position through the cavity and measuring the S-parameter response with a Vector Network Analyzer (VNA). A regulation sized ping-pong ball (40 mm diameter) filled with distilled water was used as the test entity, mimicking the previously simulated sphere. To increment the position of the test entity, cylindrical foam standoffs were constructed of heights varying from 5 mm to 50 mm in 5 mm increments and placed under the ball. These standoffs were drilled through axially, providing a hole used to consistently align standoffs in the center of the cavity along with the test entity. The VNA was configured to perform sweeps from 2-5 GHz with the Intermediate Frequency (IF) bandwidth set to 100 Hz. The empty cavity response was measured five separate times, ensuring the cavity lid was repeatably seated correctly and responses were then measured for each of the standoffs. This approach illustrates generally that candidate liquid positions and corresponding profiles can be established either experimentally or using simulation, or both.

Figure 7A:
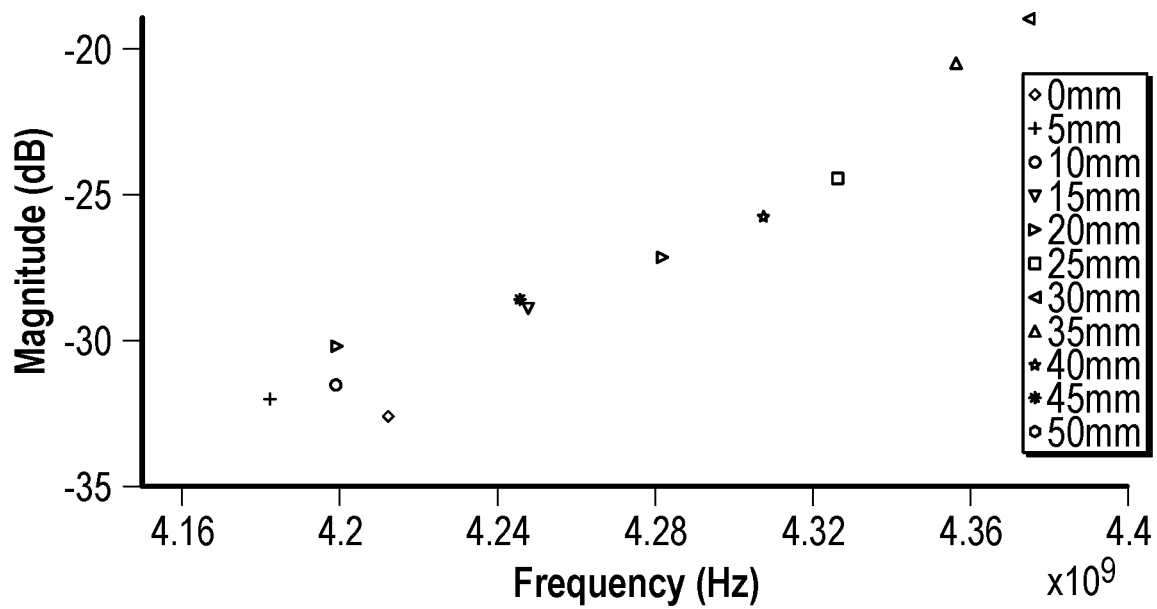
FIG. 7A is an illustrative example comprising experimentally obtained transmission S-parameter magnitude response peak values for the tank configuration of FIG. 5A for different liquid locations (e.g., different Δx values)
Figure 7B:
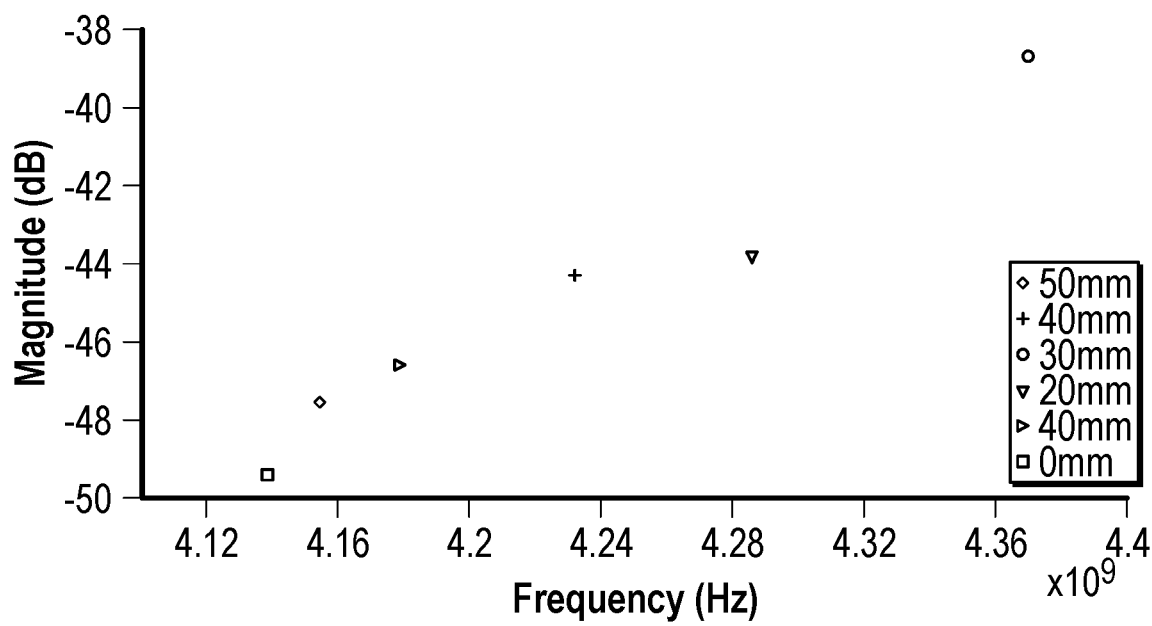
FIG. 7B shows corresponding simulated transmission S-parameter magnitude response peak values for selected liquid locations.

One approach to automate determination of a characteristic of a liquid can include detecting a peak frequency and a corresponding magnitude in a swept-frequency transmission S-parameter measurement. FIG. 7A is an illustrative example comprising experimentally obtained transmission S-parameter magnitude response peak values for the tank configuration of FIG. 5A for different liquid locations (e.g., different $\Delta x$ values) and FIG. 7B shows corresponding simulated transmission S-parameter magnitude response peak values for selected liquid locations. The plots shown in FIG. 7A and FIG. 7B were obtained using a peak detection script implemented in MATLAB (available from Mathworks, Natick, MA, USA). In the examples of FIG. 7A and FIG. 7B, peak magnitude extraction was performed for the frequency range of 4-4.5 GHz. The detected peaks were then plotted as individual points. Generally, a visible trend exists in FIG. 7A and FIG. 7B corresponding to movement of a liquid phantom and a corresponding frequency or magnitude of a detected peak in a transmission S-parameter obtained using electromagnetic excitation and sensing as shown in FIG. 7A (or corresponding simulation as shown in FIG. 7B).

The empirical and simulation-based approaches mentioned above can be used to establish candidate liquid configurations. For example, a method for establishing data related to candidate liquid configurations for use in monitoring slosh of a liquid within a propellant tank can include establishing a specified electromagnetic field configuration within the tank using an electromagnetic transmitter at a first location, sensing an electromagnetic field established within the tank by the electromagnetic transmitter using an electromagnetic receiver at a different second location, and using a control circuit, associating an independently measured characteristic of a spatial configuration of the liquid with at least one determined value associated with a resonance corresponding to the sensed electromagnetic field. Such independent measurement can include filling the tank with known quantities of the liquid, or using a phantom vessel (e.g., a sphere or other container) similar to other examples herein. Alternatively, or in addition, candidate liquid configurations can be simulated, and corresponding frequency domain profiles or other characteristics such as resonant peak frequencies, peak magnitudes, phase values, or quality factor values can be determined, corresponding to a candidate liquid profile that can then be matched or correlated with an observed characteristic.

Figure 8:
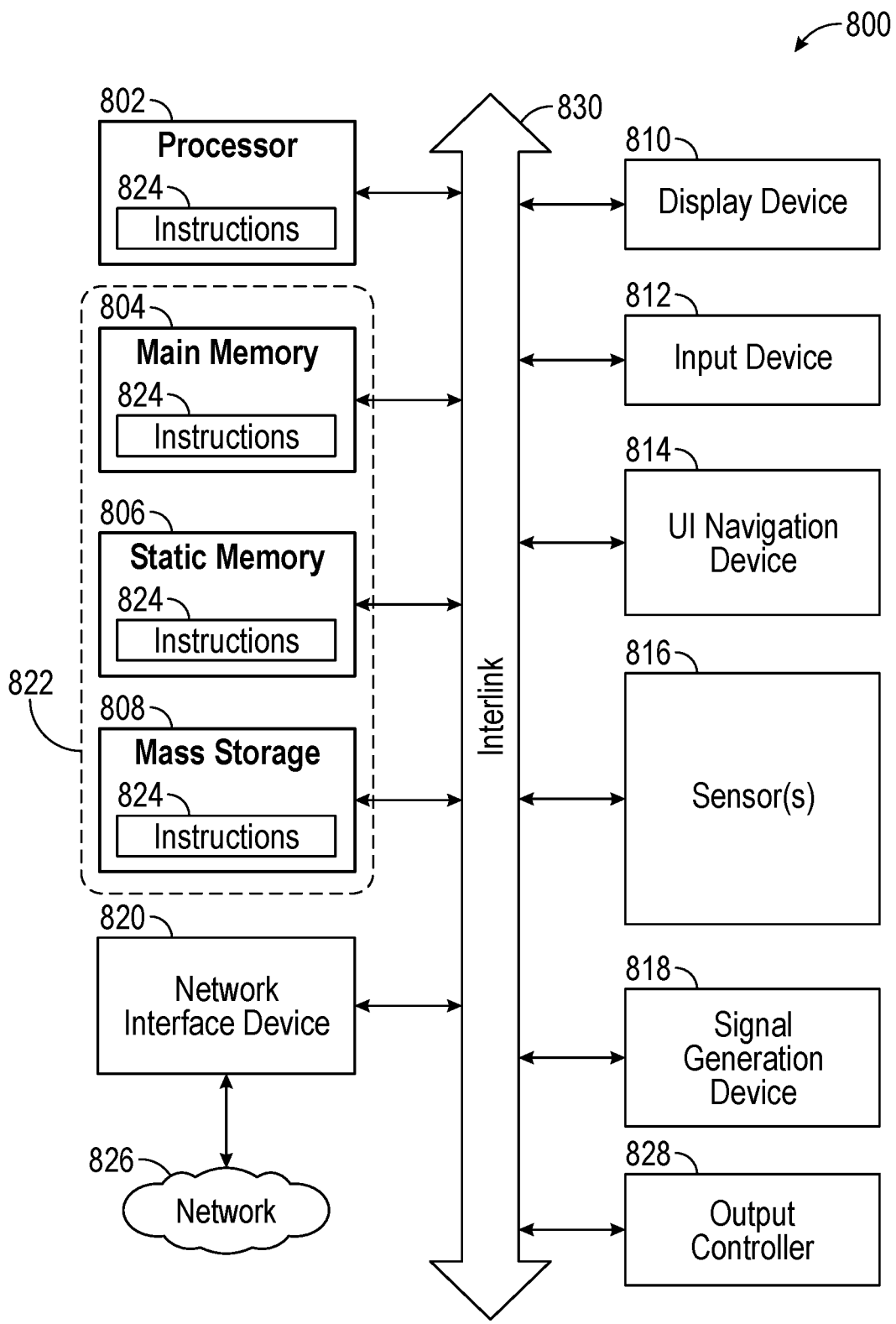
FIG. 8 is a block diagram illustrating an example of a machine upon which one or more examples may be implemented, at least in part.

FIG. 8 is a block diagram illustrating an example of a machine 800 upon which one or more examples may be implemented, at least in part. For example, the machine 800 can be included as a portion of the control circuit 110, such as comprising onboard processor or computer for an aircraft or spacecraft. Examples, as described herein, may include, or may operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.)

including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 may include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 808 (e.g., hard drive, tape drive, flash storage, or other block devices) some or all of which may communicate with each other via an interlink (e.g., bus) 830. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 808, a signal generation device 818 (e.g., a speaker), a network interface device 820, and one or more sensors 816, such as a global positioning system (GPS) sensor, compass, accelerometer, or other sensor. The machine 800 may include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 802, the main memory 804, the static memory 806, or the mass storage 808 may be, or may include, a machine readable medium 822 on which is stored one or more sets of data structures or instructions 824 (e.g., software) embodying or utilized by any one or more of the techniques or functions described herein. The instructions 824 may also reside, completely or at least partially, within any of registers of the processor 802, the main memory 804, the static memory 806, or the mass storage 808 during execution thereof by the machine 800. In an example, one or any combination of the hardware processor 802, the main memory 804, the static memory 806, or the mass storage 808 may constitute the machine readable media 822. While the machine readable medium 822 is illustrated as a single medium, the term "machine readable medium" may include a single medium or multiple media (e.g., a centralized or distributed database, and/or associated caches and servers) configured to store the one or more instructions 824.

The term "machine readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 may be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.16.4 family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

VARIOUS NOTES

Each of the non-limiting aspects above can stand on its own or can be combined in various permutations or combinations with one or more of the other aspects or other subject matter described in this document.

The above detailed description includes references to the accompanying drawings, which form a part of the detailed description. The drawings show, by way of illustration, specific embodiments in which the invention can be practiced. These embodiments are also referred to generally as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Such instructions can be read and executed by one or more processors to enable performance of operations comprising a method, for example. The instructions are in any suitable form, such as but not limited to source code, compiled code, interpreted code, executable code, static code, dynamic code, and the like.

Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A system for monitoring slosh of a liquid within a propellant tank without requiring use of a moving part, the system comprising:
   an electromagnetic transmitter positioned at a first location on or within the tank, the electromagnetic transmitter coupled to a source of electromagnetic energy and arranged to establish a specified electromagnetic field configuration within the tank using a signal from the source;
   an electromagnetic receiver positioned at a different second location on or within the tank, the electromagnetic receiver arranged to sense an electromagnetic field established within the tank by the electromagnetic transmitter; and
   a control circuit coupled to the electromagnetic receiver, the control circuit configured to determine a characteristic of a spatial configuration of the liquid using the sensed electromagnetic field;
   wherein the electromagnetic transmitter is driven using a swept-frequency excitation scheme by the source; and
   wherein the control circuit is configured to determine a position or a distribution of the liquid using at least one of a magnitude value, a phase value, a frequency value, or a quality factor value associated with a frequency-domain resonance excited by the swept-frequency excitation scheme.

2. The system of claim 1, wherein the control circuit is configured to determine a change in a position or distribution of the liquid using the sensed electromagnetic field.

3. The system of claim 1, wherein the control circuit is configured to determine a position or a distribution of the liquid using a frequency value associated with the frequency-domain resonance excited by the electromagnetic transmitter.

4. The system of claim 1, wherein the control circuit is configured to compare at least one determined value associated with the frequency-domain resonance to stored data indicative of candidate liquid configurations to determine at least one of the position or the distribution of the liquid within the tank.

5. The system of claim 1, wherein the control circuit is configured to determine a center-of-mass of the liquid using frequency-domain data indicative of the sensed electromagnetic field established within the tank.

6. The system of claim 1, wherein the electromagnetic transmitter is arranged to excite at least one transverse electric field (TE) mode within the tank, corresponding to the specified electromagnetic field configuration.

7. The system of claim 1, wherein the control circuit is configured to determine a position or a distribution of the liquid using a quality factor value associated with the frequency-domain resonance excited by the electromagnetic transmitter.

8. The system of claim 1, further comprising the source; and
wherein the source is configured to drive the electromagnetic transmitter using a range of frequencies from within a range of about 1 gigahertz (GHz) to about 6 GHz.

9. A method for monitoring slosh of a liquid within a propellant tank without requiring use of a moving part, the method comprising:
establishing a specified electromagnetic field configuration within the tank using an electromagnetic transmitter at a first location, including using a swept-frequency excitation scheme;
sensing an electromagnetic field established within the tank by the electromagnetic transmitter using an electromagnetic receiver at a different second location;
using a control circuit, determining a characteristic of a spatial configuration of the liquid using the sensed electromagnetic field; and
using the control circuit, determining a position or a distribution of the liquid using at least one of a magnitude value, a phase value, a frequency value, or a quality factor value associated with a frequency-domain resonance excited by the electromagnetic transmitter.

10. The method of claim 9, comprising, using the control circuit, determining a change in a position or distribution of the liquid using the sensed electromagnetic field.

11. The method of claim 9, comprising, using the control circuit, determining a position or a distribution of the liquid using a frequency value associated with the frequency-domain resonance excited by the electromagnetic transmitter.

12. The method of claim 9, comprising, using the control circuit, comparing at least one determined value associated with the frequency-domain resonance to stored data indicative of candidate liquid configurations to determine at least one of the position or the distribution of the liquid within the tank.

13. The method of claim 9, comprising, using the control circuit, determining a center-of-mass of the liquid using frequency-domain data indicative of the sensed electromagnetic field established within the tank.

14. The method of claim 9, wherein the establishing a specified electromagnetic field configuration comprises exciting at least one transverse electric field (TE) mode within the tank.

15. The method of claim 9, comprising, using the control circuit, determining a position or a distribution of the liquid using a quality factor value associated with the frequency-domain resonance excited by the electromagnetic transmitter.

16. The method of claim 9, wherein the electromagnetic transmitter is driven using a range of frequencies from within a range of about 1 gigahertz (GHz) to about 6 GHz.

17. A method for establishing data related to candidate liquid configurations for use in monitoring slosh of a liquid within a propellant tank without requiring use of a moving part, the method comprising:
establishing a specified electromagnetic field configuration within the tank using an electromagnetic transmitter at a first location;
sensing an electromagnetic field established within the tank by the electromagnetic transmitter using an electromagnetic receiver at a different second location; and
using a control circuit, associating an independently measured characteristic of a spatial configuration of the liquid with at least one determined value associated with a frequency-domain resonance corresponding to the sensed electromagnetic field, the frequency-domain resonance excited by the electromagnetic transmitter using a swept-frequency excitation scheme.

18. The method of claim 17, comprising associating a plurality of independent measured spatial configurations of the liquid with respective different determined values corresponding to different sensed electromagnetic fields.

19. The method of claim 17, wherein the spatial configuration comprises a position or distribution of the liquid within the tank.

20. The method of claim 19, wherein the spatial configuration comprises a quantity of liquid within the tank.

* * * * *